United States Patent

Rozmarynowski et al.

(10) Patent No.: US 9,643,276 B2
(45) Date of Patent: May 9, 2017

(54) WELDING WIRE RETRACTION SYSTEM AND METHOD

(75) Inventors: Scott Ryan Rozmarynowski, Greenville, WI (US); Caleb Robert Krisher, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1581 days.

(21) Appl. No.: 13/099,957

(22) Filed: May 3, 2011

(65) Prior Publication Data

US 2011/0309061 A1 Dec. 22, 2011

Related U.S. Application Data

(60) Provisional application No. 61/355,979, filed on Jun. 17, 2010.

(51) Int. Cl.
*B23K 9/10* (2006.01)
*B23K 9/133* (2006.01)
*B23K 9/12* (2006.01)
*B23K 9/29* (2006.01)

(52) U.S. Cl.
CPC ........ *B23K 9/1336* (2013.01); *B23K 9/125* (2013.01); *B23K 9/295* (2013.01)

(58) Field of Classification Search
CPC ....... B23K 9/125; B23K 9/1336; B23K 9/295
USPC ............... 219/130.01, 130.1, 136, 136 R, 219/137.7–139
See application file for complete search history.

(56) References Cited

U.S. PATENT DOCUMENTS

| 3,141,085 | A | 7/1964 | Manz |
| 7,244,908 | B2 * | 7/2007 | Ward ............................ 219/132 |
| 2004/0045946 | A1 | 3/2004 | Davidson et al. |
| 2009/0277893 | A1 * | 11/2009 | Speilman ................. 219/137.71 |

FOREIGN PATENT DOCUMENTS

DE 10 2005 041695 A1 3/2007
JP 10 052755 A 2/1996

OTHER PUBLICATIONS

English machine translation de 10 2005 041 695 (Mar. 2007).*
International Search Report for application No. PCT/US2011/040395 mailed Sep. 28, 2011.

* cited by examiner

*Primary Examiner* — Sang Y Paik
(74) *Attorney, Agent, or Firm* — Fletcher Yoder P.C.

(57) ABSTRACT

A method and system for retracting welding wire is provided. One welding torch includes a handle configured to receive welding wire from a wire source and to direct the welding wire to a torch tip. The welding torch also includes a first switch coupled to the handle and configured to cause the welding wire to extend out of the torch tip to expose more wire when the first switch is actuated. The welding torch includes a second switch coupled to the handle and configured to cause the welding wire to retract into the torch tip to expose less wire when the second switch is actuated.

17 Claims, 5 Drawing Sheets

WELDING WIRE RETRACTION SYSTEM AND METHOD

CROSS REFERENCE TO RELATED APPLICATIONS

This application is a Non-Provisional Patent Application of U.S. Provisional Patent Application No. 61/355,979 entitled "Wire Retract Button on MIG Gun", filed Jun. 17, 2010, which is herein incorporated by reference.

BACKGROUND

The invention relates generally to welding systems and, more particularly, to a method and system for retracting welding wire in a welding system.

Welding is a process that has become increasingly ubiquitous in various industries and applications. Such processes may be automated in certain contexts, although a large number of applications continue to exist for manual welding operations. In both cases, such welding operations rely on a variety of types of equipment to ensure that the supply of welding consumables (e.g., wire feed, shielding gas, etc.) is provided to the weld in an appropriate amount at the desired time. For example, metal inert gas (MIG) welding typically relies on a wire feeder to enable a welding wire to reach a welding torch, the wire being continuously fed during welding to provide filler metal and to ensure that arc heating is available to melt the filler metal and the underlying base metal.

In MIG welding applications, the wire feeder typically provides a continuous feed of welding wire so long as a trigger is actuated by the welding operator. Unfortunately, quite commonly more welding wire than desired may be provided to the welding torch causing the welding wire to extend too far out of the torch, such as if the trigger is depressed when no arc is ongoing. Thus, in such conditions, the welding wire is often cut to the desired length by the operator, using a wire cutting tool, or the welding wire is burned off on a non-essential area of a workpiece (or weldment), leaving a "whisker" or wire extending out of the workpiece. Therefore, welding wire may be wasted and welding efficiency may decrease due to the time needed to cut the welding wire. There is a need in the field for techniques that might provide alternatives to cutting excess welding wire when too much welding wire extends out of a welding torch.

BRIEF DESCRIPTION

In an exemplary embodiment, a welding torch includes a handle configured to receive welding wire from a wire source and to direct the welding wire to a torch tip. The welding torch also includes a first switch coupled to the handle and configured to cause the welding wire to extend out of the torch tip to expose more wire when the first switch is actuated. The welding torch includes a second switch coupled to the handle and configured to cause the welding wire to retract into the torch tip to expose less wire when the second switch is actuated.

In another embodiment, a welding system includes a welding power supply configured to provide welding power. The welding system also includes a welding torch having a trigger and configured to receive welding power from the welding power supply and to extend welding wire out of the welding torch when the trigger is pressed. The welding system includes a reverse switch configured to retract the welding wire into the welding torch when actuated.

In another embodiment, a method for retracting welding wire includes receiving an indication that a welding wire retraction switch is actuated. The method also includes sending a command to a wire drive to rotate the wire drive in reverse to retract welding wire from a torch based upon the received indication.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
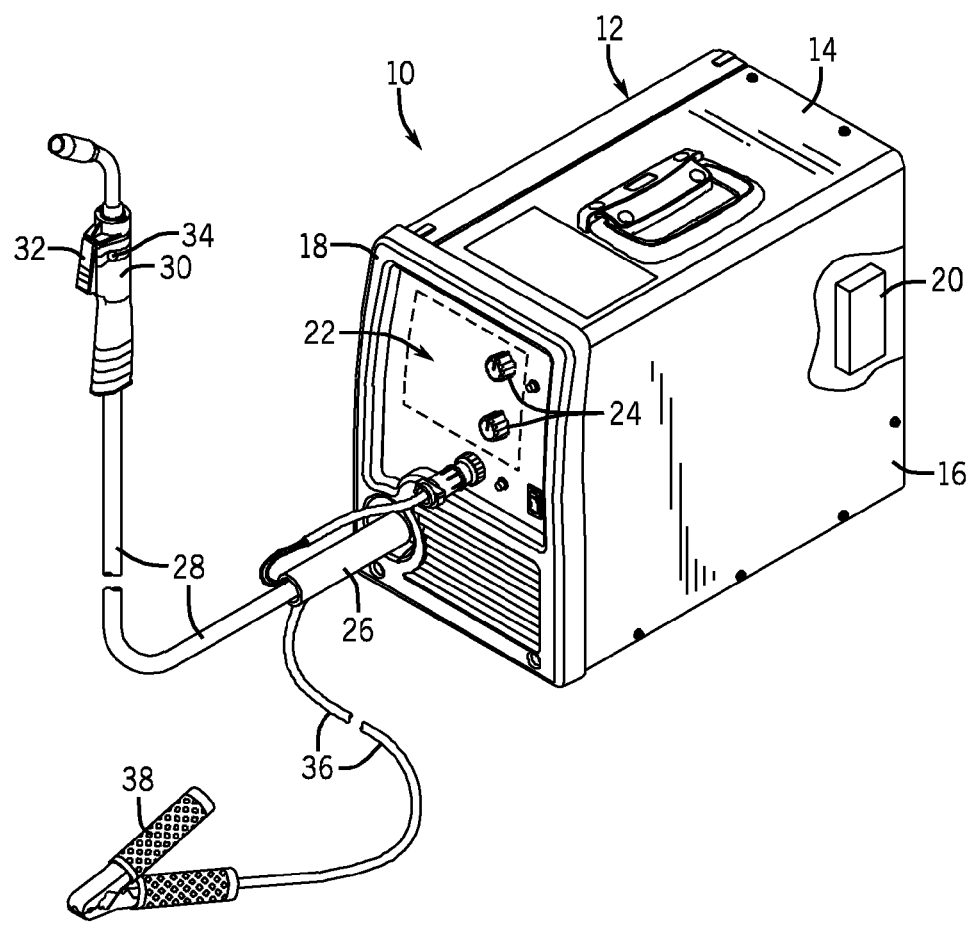
FIG. 1 is a perspective view of an embodiment of a welding power supply employing a welding torch with a reversing switch.

Turning now to the drawings, FIG. 1 is a perspective view of an exemplary welding power supply 10 configured for use in a gas metal arc welding (GMAW) process or a flux cored arc welding (FCAW) process. The welding power supply 10 includes a housing 12 including a top panel 14, a side panel 16, and a front panel 18. The top panel 14 may include a handle that facilitates transport of the welding power supply 10 from one location to another by an operator if desired. The side panel 16 includes a breakaway view illustrating a controller 20 configured to control operation of the welding power supply 10. The front panel 18 includes a control panel 22 adapted to allow an operator to set one or more parameters of the welding process, for example, via knobs 24 (or buttons, touchscreens, etc.).

In certain embodiments, the welding power supply 10 includes the functionality of a wire feeder (i.e., internal wire feeder). Such embodiments may include a wire drive configured to receive control signals to drive a wire spool. The wire drive feeds wire for the welding operation. In another embodiment, a separate wire feeder may attach to the welding power supply 10 (i.e., external wire feeder). Such a separate wire feeder may also include a wire drive and a wire spool.

A main electrical connector 26 couples to the welding power supply 10 via the front panel 18. A cable 28 extends from the main connector 26 to a welding torch 30 configured to be utilized in a welding operation to establish a welding arc. The welding torch 30 includes a trigger 32 and a reverse switch 34 (or button). The trigger 32 initiates a welding operation and causes welding wire to be supplied to the welding operation by exposing welding wire when pressed. Furthermore, pressing the trigger 32 may cause a switch in the trigger 32 to be actuated. The reversing button 34 causes welding wire to be retracted into the torch when pressed (or actuated). In certain embodiments, wire may be supplied to a welding operation using a spoolgun attached to a welding power supply. In such configurations, the spoolgun may include a reversing button to retract welding wire into the spoolgun.

A second cable 36 is attached to the welding power supply 10 through an aperture in the front panel 18 and terminates in a clamp 38 that is adapted to clamp to the workpiece during a welding operation to close the circuit between the welding power supply 10, the welding torch 30, and the workpiece. During such an operation, the welding power supply 10 is configured to receive primary power from a primary power supply, such as a power source (e.g., the power grid, engine-generator, etc.), to condition such incoming power, and to output a weld power output appropriate for use in the welding operation.

Figure 2:
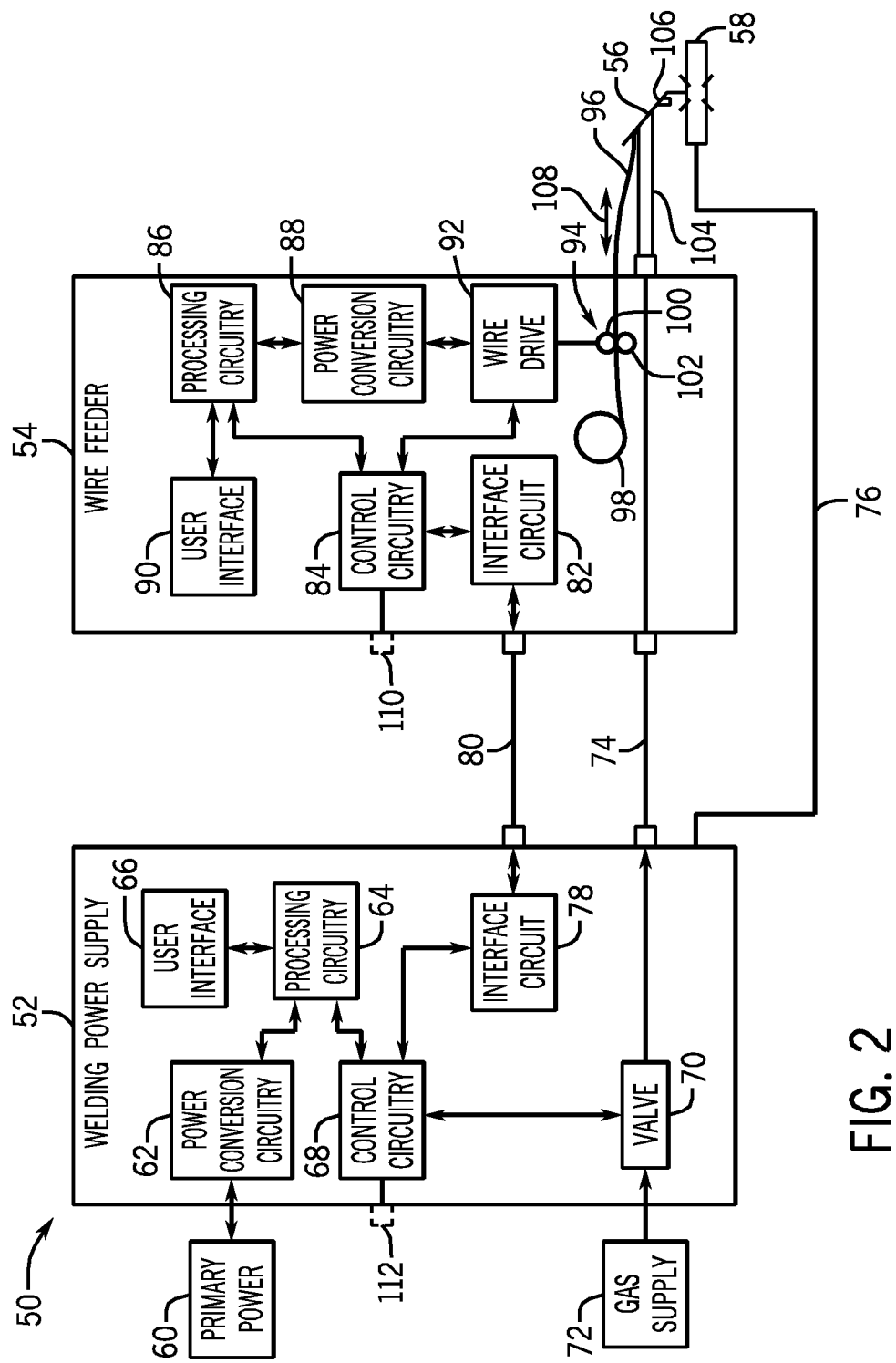
FIG. 2 is a schematic diagram of an embodiment of a welding system employing a reverse switch.

FIG. 2 is a schematic diagram of an embodiment of a welding system 50 employing a reverse switch. The welding system 50 powers, controls, and supplies consumables to a welding application. The welding system 50 includes a welding power supply 52, a wire feeder 54, a torch 56, and a workpiece 58. The welding power supply 52 receives primary power 60 from an input power source (e.g., the AC power grid, an engine/generator set, a battery, or other energy generating or storage devices, or a combination thereof), conditions the input power, and provides an output power to one or more welding devices in accordance with demands of the system 50. The primary power 60 may be supplied from an offsite location (i.e., the primary power may originate from the power grid). Accordingly, the welding power supply 52 includes power conversion circuitry 62 that may include circuit elements such as transformers, rectifiers, switches, and so forth, capable of converting the AC input power to AC or DC output power as dictated by the demands of the system 50 (e.g., particular welding processes and regimes). Such circuits are generally known in the art.

In some embodiments, the power conversion circuitry 62 may be configured to convert the primary power 60 to both weld and auxiliary power outputs. However, in other embodiments, the power conversion circuitry 62 may be adapted to convert primary power only to a weld power output, and a separate auxiliary converter may be provided to convert primary power to auxiliary power. Still further, in some embodiments, the welding power supply 62 may be adapted to receive a converted auxiliary power output directly from a wall outlet. Indeed, any suitable power conversion system or mechanism may be employed by the welding power supply 52 to generate and supply both weld and auxiliary power.

The welding power supply 52 includes processing circuitry 64, a user interface 66, and control circuitry 68. The processing circuitry 64 controls the operations of the welding power supply 52 and may receive input from the user interface 66 through which a user may choose a process, and input desired parameters (e.g., voltages, currents, particular pulsed or non-pulsed welding regimes, and so forth). The control circuitry 68 may be configured to receive and process a plurality of inputs regarding the performance and demands of the system 50. Furthermore, the control circuitry 68 communicates with the processing circuitry 64 to control parameters input by the user as well as any other parameters. The control circuitry 68 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

The welding power supply 52 may also include a valve 70 to modulate the amount of gas supplied to a welding operation. The valve 70 operates with signals from the control circuitry 68. A gas supply 72 may provide shielding gases, such as argon, helium, carbon dioxide, and so forth. The gas flows from the welding power supply 52 to the wire feeder 54 through a cable 74 coupled between the welding power supply 52 and the wire feeder 54. A lead cable 76, which may be terminated with a clamp, couples the welding power supply 52 to the workpiece 58 to complete the welding circuit.

Data is communicated between the control circuitry 68 and an interface circuit 78. The interface circuit 78 conditions the data from the control circuitry 68 for communication to other welding devices, such as the wire feeder 54 and a pendant. Data conditioned in the welding power supply 52 is communicated to the wire feeder 54 over a control cable 80. Power may also be transmitted over the control cable 80.

The conditioned data is received by the wire feeder 54 and converted by an interface circuit 82 to signals compatible with a control circuitry 84 of the wire feeder 54. Further, the interface circuit 82 may receive signals from control circuitry 84 for transmission to the welding power supply 52. The control circuitry 84 communicates with a processing circuitry 86. Such a processing circuitry 86 controls the functionality of the wire feeder 54 and is powered via a power conversion circuitry 88. The processing circuitry 86 may receive input from a user interface 90 through which a user may input desired parameters (e.g., voltages, currents, wire speed, and so forth). The wire feeder 54 includes a wire drive 92 that receives control signals from the control circuit 84 to drive rollers 94. The rollers 94 feed wire 96 from a wire spool 98 to a welding operation via a first roller 100 and a second roller 102. Shielding gas and welding power are supplied to the welding operation using one or more cables 104.

During operation, a trigger on the welding torch 56 may initiate a weld, causing the wire drive 94 to rotate the rollers 94 in a forward direction to supply wire 96 for the weld, thereby exposing a greater amount of wire 96. Furthermore, the welding torch 56 includes a reverse switch (or button) 106. When pressed, the reverse switch 106 causes the wire drive 94 to rotate the rollers 94 in a reverse direction to retract wire 96 into the welding torch 56, thereby exposing a smaller amount of wire 96. Thus, welding wire 96 may move in a forward or reverse direction as illustrated by arrow 108.

According to certain embodiments, the wire feeder 54 may include reverse switch 110 and/or the welding power supply 52 may include a reverse switch 112. Thus, one or more of the welding torch 56, wire feeder 54, and welding power supply 52 may include a reverse switch to cause the wire drive 94 to rotate the rollers 94 in a reverse direction to expose a smaller amount of wire 96. As may be appreciated, while performing a weld, a reverse switch may enable a welding operator to efficiently adjust the length of wire 96 extending out of the welding torch 56 without the need for additional tools.

Figure 3:
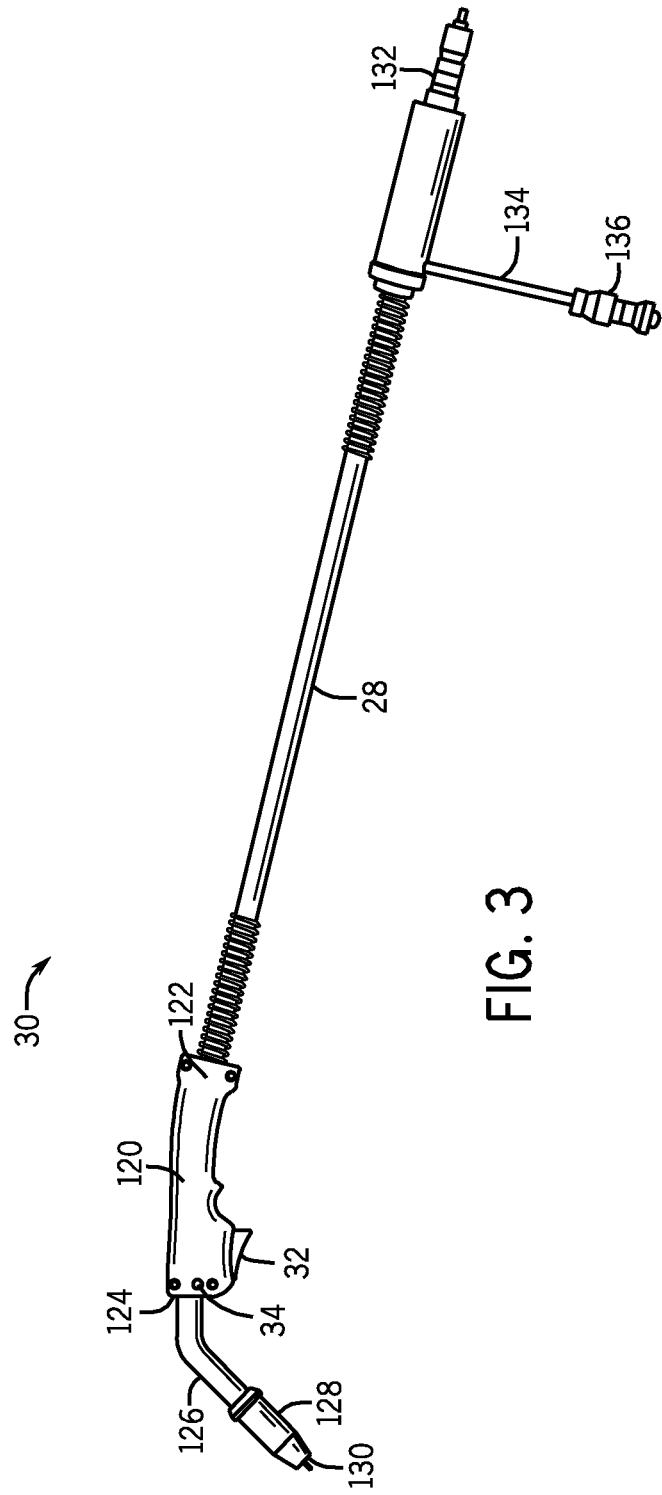
FIG. 3 is a side view of an embodiment of the welding torch of FIG. 1 employing the reverse switch.

FIG. 3 illustrates an embodiment of the welding torch 30 of FIG. 1. As discussed in relation to FIG. 1, the welding torch 30 includes the trigger 32 for initiating a weld and supplying wire to the weld and the reverse switch 34 for retracting wire into the welding torch 30. Specifically, the trigger 32 and the reverse switch 34 are disposed on a handle 120. A welding operator holds the handle 120 when performing a weld. At one end 122, the handle 120 is coupled to the cable 28 where welding consumables are supplied to the weld. Welding consumables generally travel through the handle 120 and exit at an end 124, which is disposed on the handle 120 at an end opposite from end 122.

The welding torch 30 includes a neck 126 extending out of end 124. As such, the neck 126 is coupled between the handle 120 and a nozzle 128. As should be noted, when the trigger 32 is pressed or actuated, welding wire travels through the cable 28, the handle 120, the neck 126, and the nozzle 128, so that the welding wire extends out of an end 130 (i.e., torch tip) of the nozzle 128. Furthermore, when the reverse switch 34 is pressed or actuated, the welding wire retracts into the nozzle 128. The reverse switch 34 may be one of a variety of types of switches or buttons. For example, the reverse switch 34 may be a momentary contact switch which energizes an electrical circuit while pressed or another type of switch. In addition, the reverse switch 34 may be molded as part of the handle 120, or the reverse switch 34 may be installed into an opening in the handle 120. The reverse switch 34 may be constructed using any suitable material, such as a polymeric material.

Furthermore, the reverse switch 34 may send signals to control circuitry which controls the response to actuation of the reverse switch 34. Specifically, control circuitry may retract welding wire for an unlimited amount of time while the reverse switch 34 remains actuated. In certain embodiments, control circuitry may retract welding wire for a predetermined amount of time, or a predetermined quantity of welding wire with each actuation of the reverse switch 34. For example, the predetermined amount of time may be approximately 0.1 to 1.0 seconds, or any subranges therebetween. Likewise, the predetermined amount of time may be any suitable amount of time. As another example, the predetermined quantity of welding wire may be approximately 1/16" to 1/4", or any subranges therebetween. Further, the predetermined quantity of welding wire may be any suitable quantity. In certain embodiments, actuating the trigger 32 inhibits the reverse switch 34 from being actuated, actuating the reverse switch 34 inhibits the trigger 32 from being actuated, or any combination thereof.

A connector 132 is coupled to cable 28 and during a welding operation connector 132 is connected to the welding power supply 10 depicted in FIG. 1. At least welding wire and welding power are transferred through the connector 132. A second cable 134 extends from cable 28 and terminates with a connector 136. Control signals from the trigger 32 and reverse switch 34 may be transmitted through cable 134 to control circuitry. As may be appreciated, before starting a weld, a welding operator may notice that more welding wire than desired extends out of nozzle end 130. Therefore, the welding operator may actuate reverse switch 34 to retract welding wire into nozzle end 130. For example, the welding operator may desire to have approximately 3/8" of welding wire extend out of nozzle end 130. Rather than using welpers to cut the wire, the welding operator may use reverse switch 34 to retract welding wire into the nozzle 130.

Figure 4:
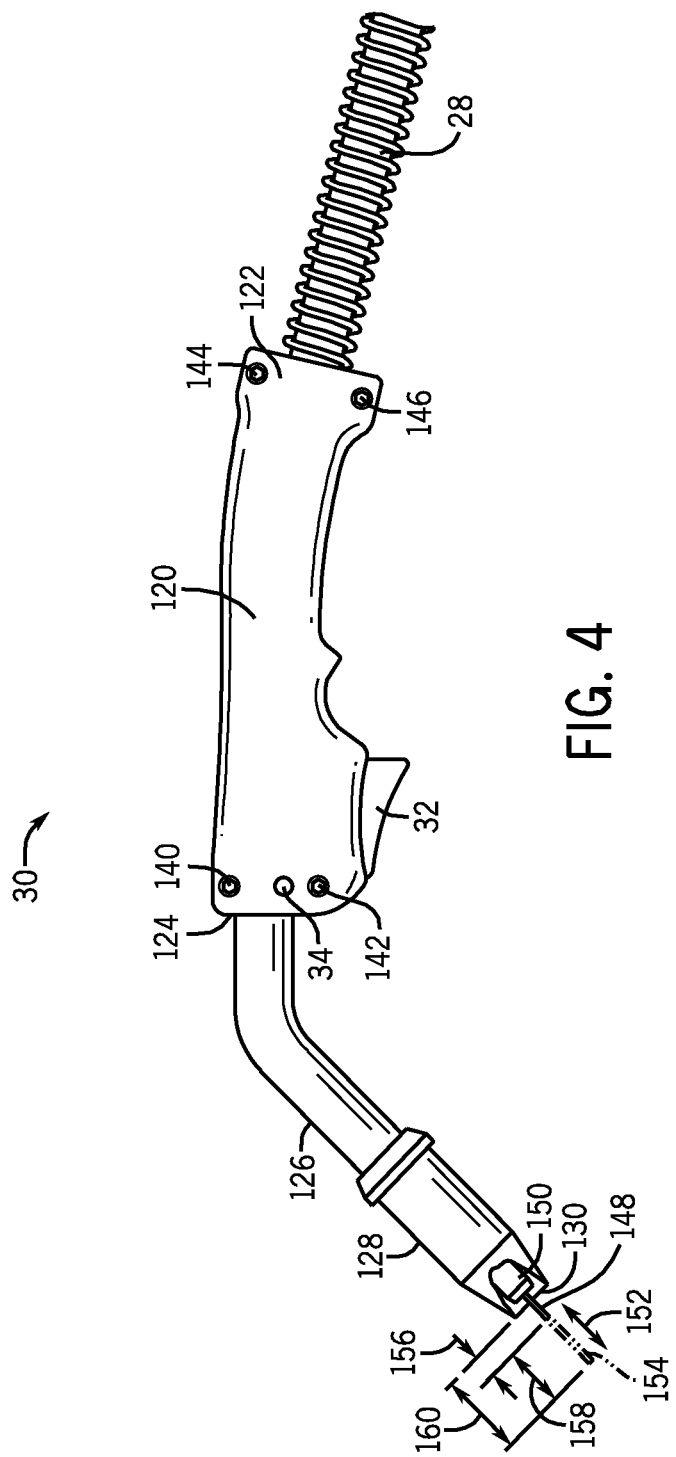
FIG. 4 is a break-away view of a portion of the welding torch of FIG. 3.

FIG. 4 is a break-away view of a portion of the welding torch 30 of FIG. 3. As illustrated, the handle 120 is secured to the neck 126 via fasteners 140 and 142, and to cable 128 via fasteners 144 and 146. The nozzle 128 is illustrated with a portion of the nozzle 128 removed to show welding wire 148 extending out of a contact tip 150. The welding wire 148 may extend or retract from the contact tip 150 as shown via arrow 152. For example, during a weld, the welding wire 148 may extend out of the contact tip 150 a greater length than desired, such as illustrated by the broken lines depicting extended wire 154. The length that a welding operator desires is a length 156, while the extended wire 154 extends a length 158 greater than length 156, or a total length 160 from the nozzle end 130. For example, the welding operator may desire the length 156 to be approximately 3/8". The total length 160 may be approximately 7/8", therefore, the welding operator may use the reverse switch 34 to retract the welding wire into the contact tip 150 the length 158 (i.e., approximately 1/2" in this example). As may be appreciated, the desired length 156, total length 160, and retracted length 158 may vary based at least on the type of weld being performed, and the excess amount of wire extending from the nozzle end 130.

Figure 5:
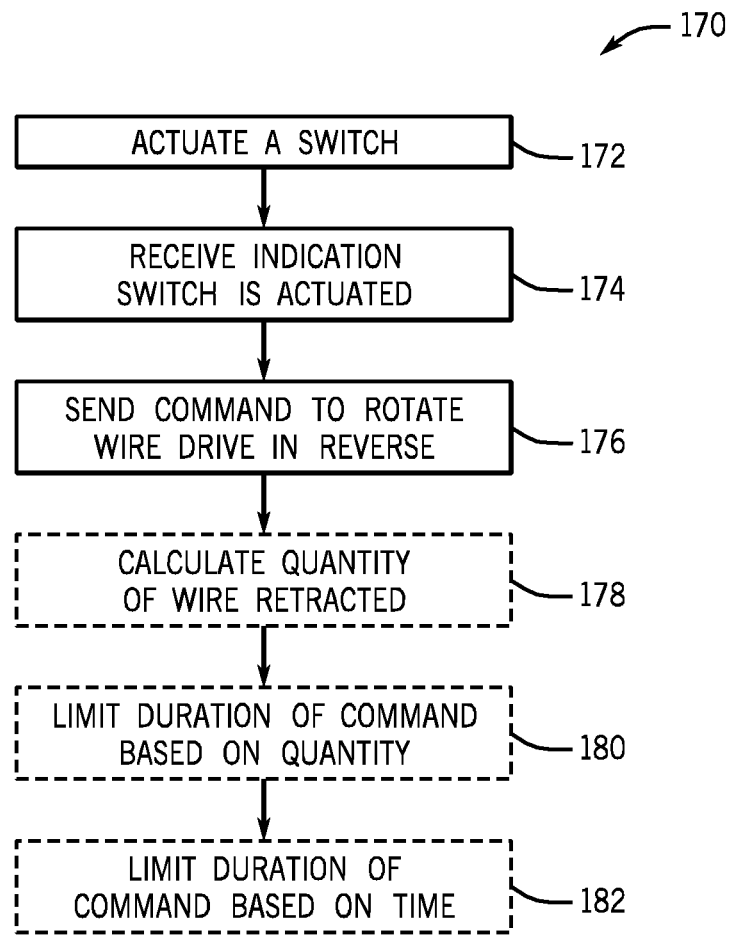
FIG. 5 is a flow chart of an embodiment of a method for retracting welding wire.

FIG. 5 is a flow chart of an embodiment of a method 170 for retracting welding wire. At step 172, a welding operator actuates a reverse switch. Next, at step 174, control circuitry receives an indication that the reverse switch is actuated. For example, the indication may be a voltage change to a control circuitry input that is present as long as the reverse switch is actuated. Then, at step 176, the control circuitry sends a command to rotate wire drive rollers in a reverse direction. The reverse direction is the opposite direction of rotation compared to the direction of roller rotation when performing a weld. In certain embodiments, the control circuitry may calculate a quantity of wire retracted while the rollers rotate, at step 178. Such a calculation may be used by the control circuitry to limit the amount of wire retracted by the wire drive and may be based at least partly on the speed of rotation and the size of the rollers. At step 180, the control circuitry may limit the duration of the command to the wire drive based at least partly on the quantity calculated at step 178. In some embodiments, at step 182, the control circuitry may limit the duration of the retraction command based at least partly on a predetermined amount of time that the command is sent. As may be appreciated, the method 170 may have a greater or lesser number of steps than described, and the steps may be performed in a different order.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch comprising:
   a handle configured to receive welding wire from a wire source and to direct the welding wire to a torch tip;
   a first switch coupled to the handle and configured to cause the welding wire to extend out of the torch tip to expose more wire when the first switch is actuated; and
   a second switch coupled to the handle and configured to cause the welding wire to retract into the torch tip to expose less wire when the second switch is actuated, wherein the second switch is configured to retract the welding wire for a predetermined amount of time or to retract a predetermined quantity of welding wire for each actuation of the second switch.

2. The welding torch of claim 1, wherein the first switch comprises a trigger for initiating a welding operation.

3. The welding torch of claim 1, wherein the second switch comprises a momentary contact switch.

4. The welding torch of claim 1, wherein the second switch is configured to retract the welding wire for the predetermined amount of time for each actuation of the second switch.

5. The welding torch of claim 1, wherein the second switch is configured to retract the predetermined quantity of the welding wire for each actuation of the second switch.

6. The welding torch of claim 1, wherein the second switch is configured to cause continuous retraction of the welding wire so long as the second switch remains actuated.

7. The welding torch of claim 1, wherein the first switch is configured to inhibit the second switch from being actuated when the first switch is actuated.

8. The welding torch of claim 1, wherein the second switch is configured to inhibit the first switch from being actuated when the second switch is actuated.

9. The welding torch of claim 1, wherein the first switch is configured to inhibit the second switch from being actuated when the first switch is actuated and the second switch is configured to inhibit the first switch from being actuated when the second switch is actuated.

10. A welding system comprising:
a welding power supply configured to provide welding power; and
a welding torch configured to receive the welding power from the welding power supply, wherein the welding torch comprises:
a trigger configured to extend welding wire out of the welding torch when the trigger is pressed; and
a reverse switch configured to retract the welding wire into the welding torch when actuated, wherein the reverse switch is configured to retract the welding wire for a predetermined amount of time or to retract a predetermined quantity of welding wire for each actuation of the reverse switch.

11. The welding system of claim 10, wherein the reverse switch is configured to retract the welding wire for the predetermined amount of time for each actuation of the reverse switch.

12. The welding system of claim 10, wherein the reverse switch is configured to retract the predetermined quantity of the welding wire for each actuation of the reverse switch.

13. A method for retracting welding wire comprising:
receiving an indication that a welding wire refraction switch is actuated;
sending a command to a wire drive to rotate the wire drive in reverse to retract welding wire from a welding torch based upon the received indication; and
limiting a duration of the command based at least partly on a predetermined amount of time or a predetermined quantity of the welding wire retracted for each actuation of the switch.

14. The method of claim 13, wherein sending a command based at least partly on the indication comprises sending a command to a wire drive to rotate the wire drive in reverse as long as the switch is actuated.

15. The method of claim 13, comprising calculating a quantity of the welding wire retracted and limiting the duration of the command based at least partly on the calculated quantity of welding wire refracted for each actuation of the switch.

16. The method of claim 13, comprising limiting the duration of the command based at least partly on the predetermined amount of time for each actuation of the switch.

17. The method of claim 13, comprising limiting the duration of the command based at least partly on the predetermined quantity of the welding wire refracted for each actuation of the switch.

* * * * *